INVENTORS
G.B. FLIEZAR
J.J. MONAHAN
By
ATTORNEY

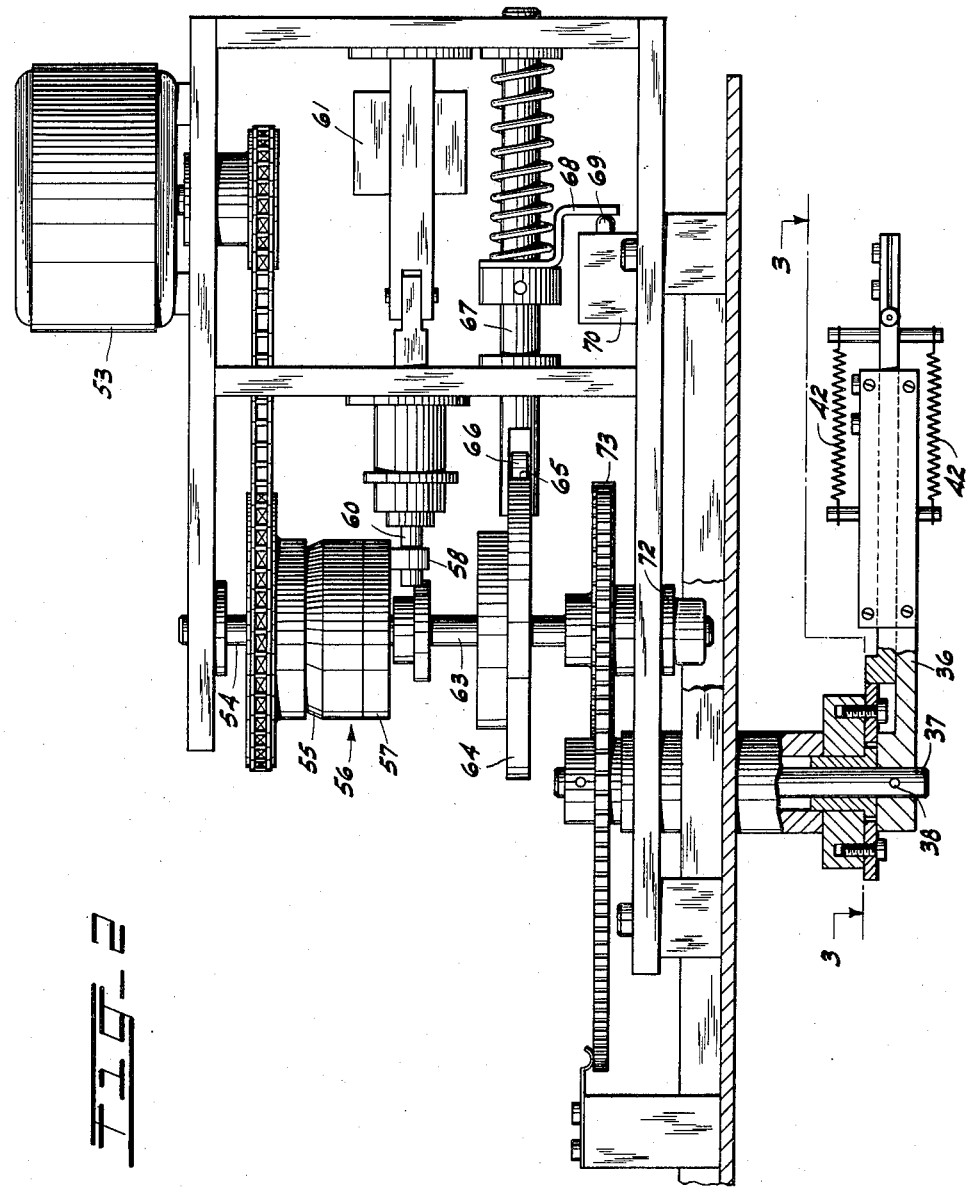

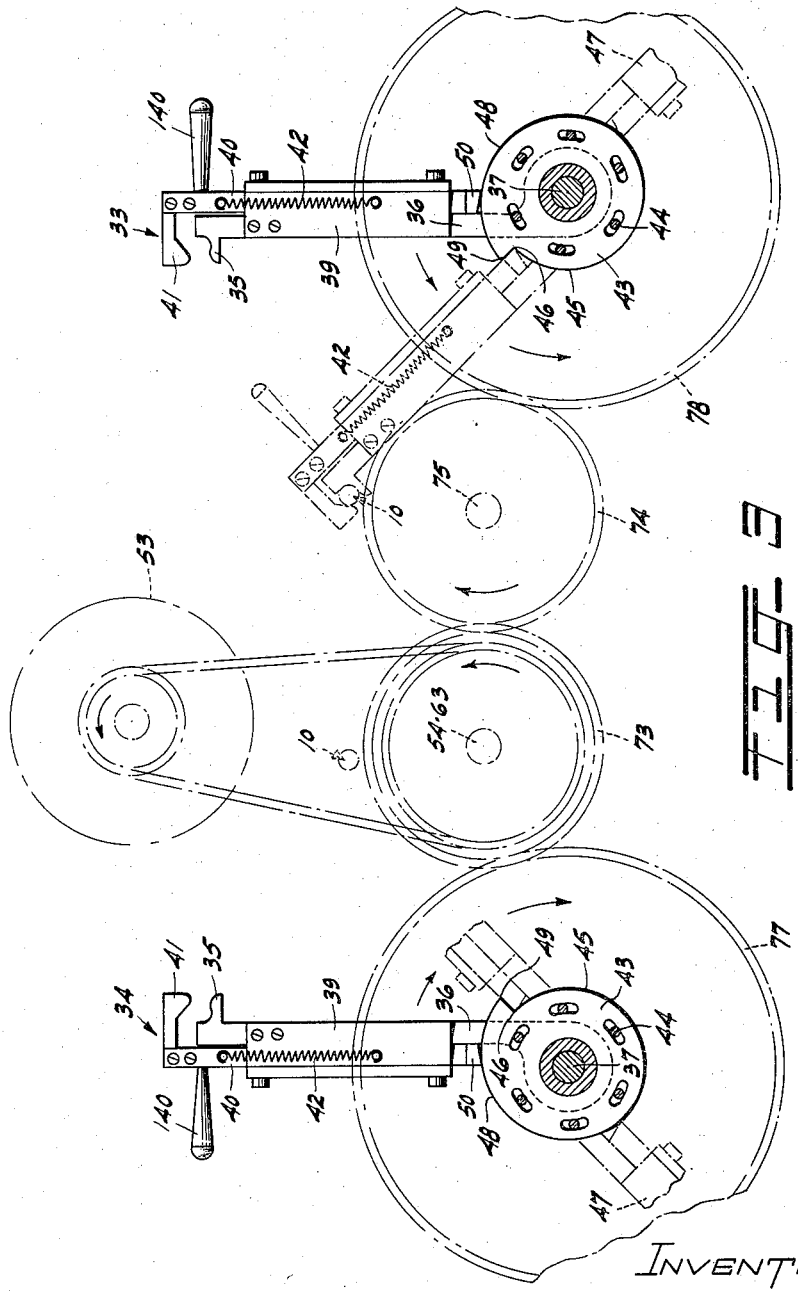

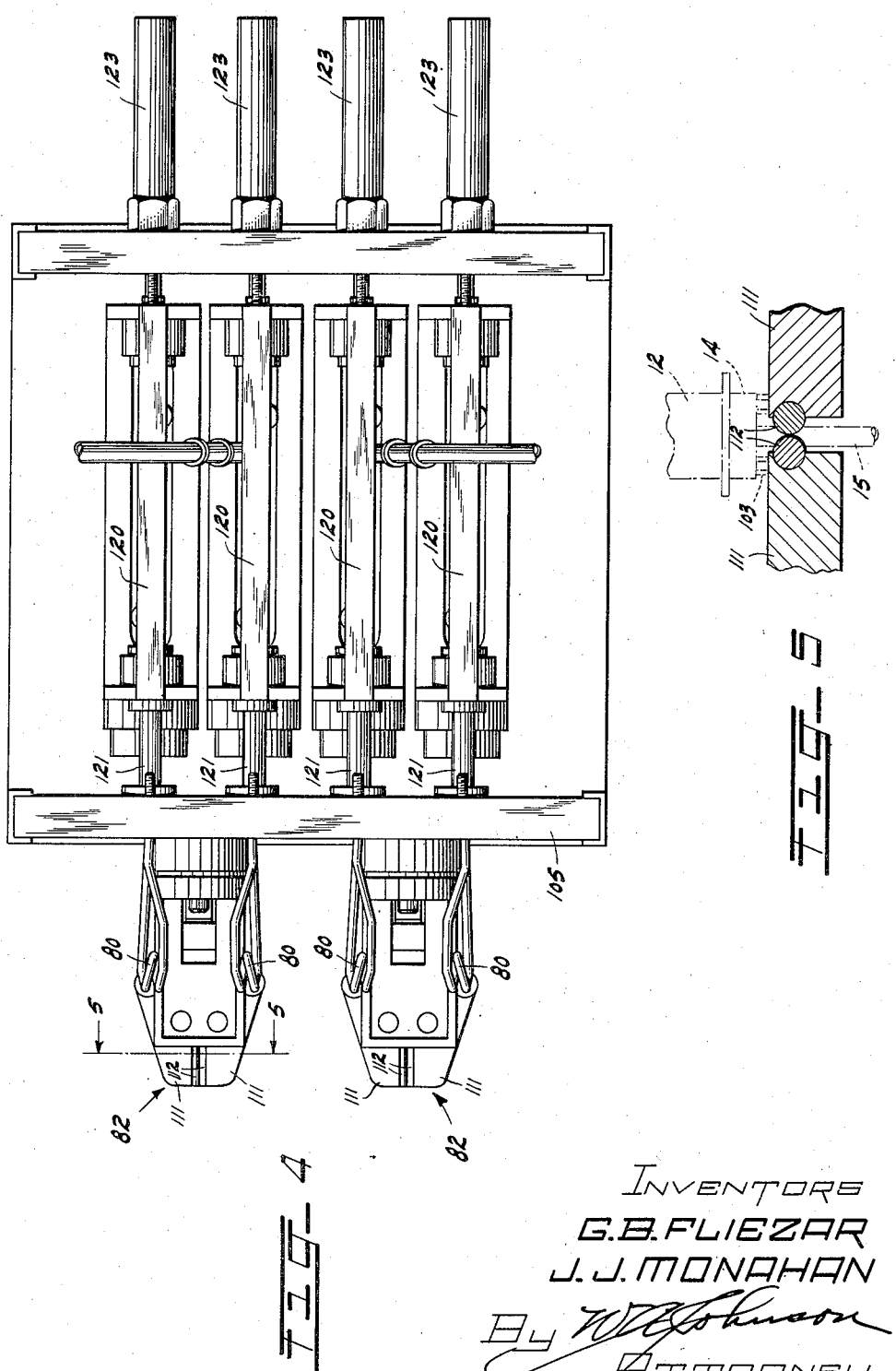

June 26, 1962 G. B. FLIEZAR ET AL 3,041,128
FINISHING STATION FOR WAVE TUBE EXHAUST MACHINE
Filed Nov. 18, 1959 7 Sheets-Sheet 6
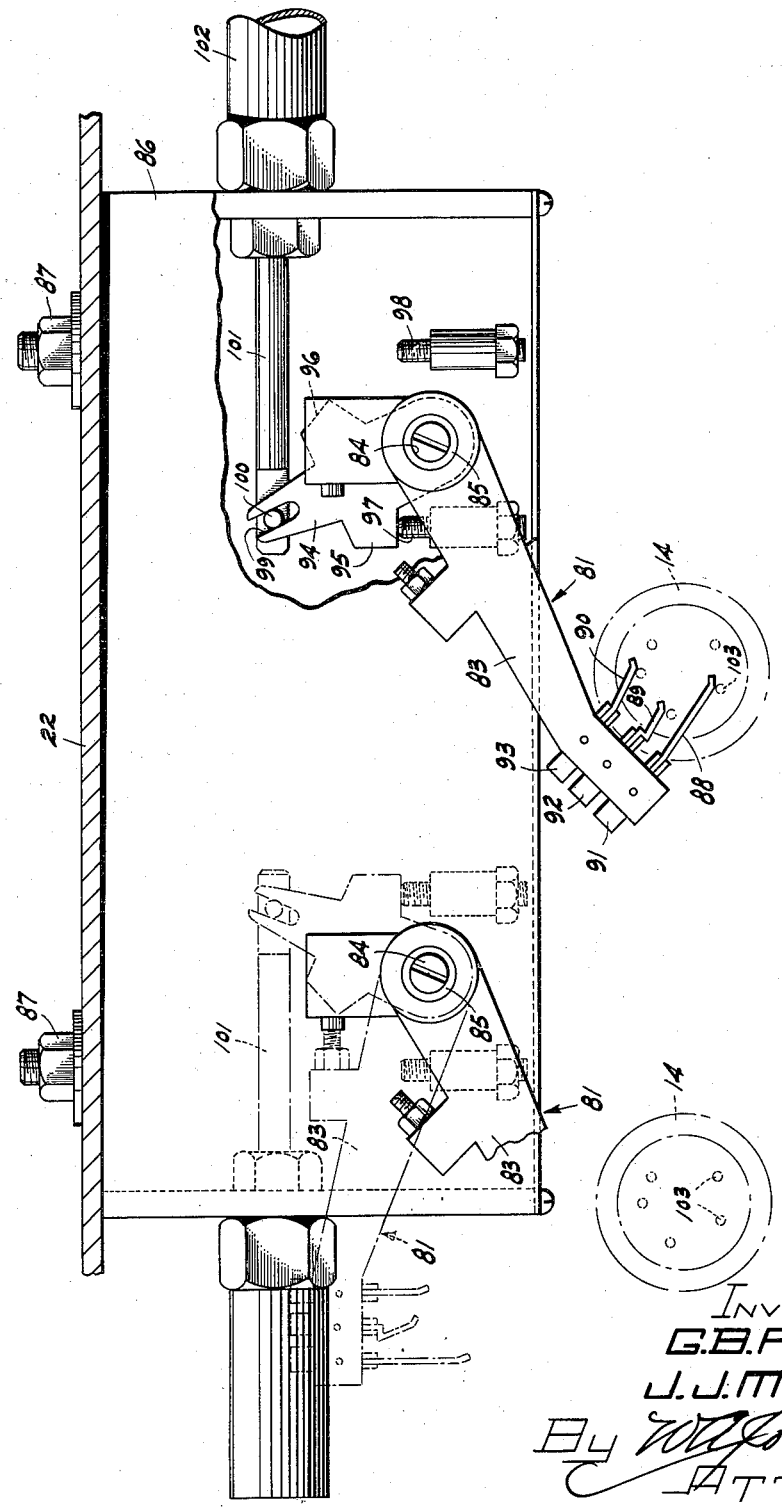
FIG. 8
INVENTORS
G.B. FLIEZAR
J.J. MONAHAN
By
ATTORNEY June 26, 1962  G. B. FLIEZAR ET AL  3,041,128
FINISHING STATION FOR WAVE TUBE EXHAUST MACHINE
Filed Nov. 18, 1959  7 Sheets-Sheet 7

INVENTORS
G. B. FLIEZAR
J. J. MONAHAN
By Johnson
ATTORNEY

United States Patent Office 3,041,128
Patented June 26, 1962

3,041,128
FINISHING STATION FOR WAVE TUBE
EXHAUST MACHINE
Geza B. Fliezar and Jack J. Monahan, Allentown, Pa.,
assignors to Western Electric Company, Incorporated,
New York, N.Y., a corporation of New York
Filed Nov. 18, 1959, Ser. No. 853,965
8 Claims. (Cl. 316—30)

This invention relates to apparatus for treating articles, particularly traveling wave tubes.

When approaching the finishing steps in the manufacture of traveling wave tubes, the elongated hollow articles are complete in assembly but must have certain treatments performed thereon prior to having the metal tubulations at their lower ends pinched off and sealed. For example, the fuse in each wave tube is blown and the getters are out-gassed a second time, after which each getter is flashed one at a time and when the proper pressure is reached, through the connection of the tube with an exhausting means, the tubulation is pinched off.

An object of the present invention is an apparatus for efficiently treating and/or finishing articles.

According to the object, the invention comprises an apparatus for treating articles wherein a holder receives and supports the article at a treating position. A clamp adapted to grip the article is supported for movement into and out of the treating position and has means associated therewith to impart two movements thereto, one to move the clamp to the treating position to grip the article, and a subsequent movement to move the article out of the treating position.

The apparatus has various features for treating and finishing the article or traveling wave tube. In the present instance, two articles are moved into a treating station where a fixed position housing carries two clamps and the driving means therefor, two pairs of pinching jaws and other treating units including high frequency coils and contact units, all of which are operated in a certain sequence to bring about treating and finishing of the articles or traveling wave tubes.

Other objects and advantages will be apparent from the following detailed description when considered in conjunction with the accompanying drawings wherein:

FIG. 2 is an enlarged side elevational view of the clamp driving mechanism, portions thereof being shown in section;

FIG. 3 is a fragmentary sectional view taken substantially along the line 3—3 of FIG. 2;

FIG. 4 is a top plan view of a portion of the treating mechanism;

FIG. 5 is an enlarged fragmentary sectional view taken along the line 5—5 of FIG. 4;

FIG. 8 is a top plan view terminal contacting means; and

Figure 1:
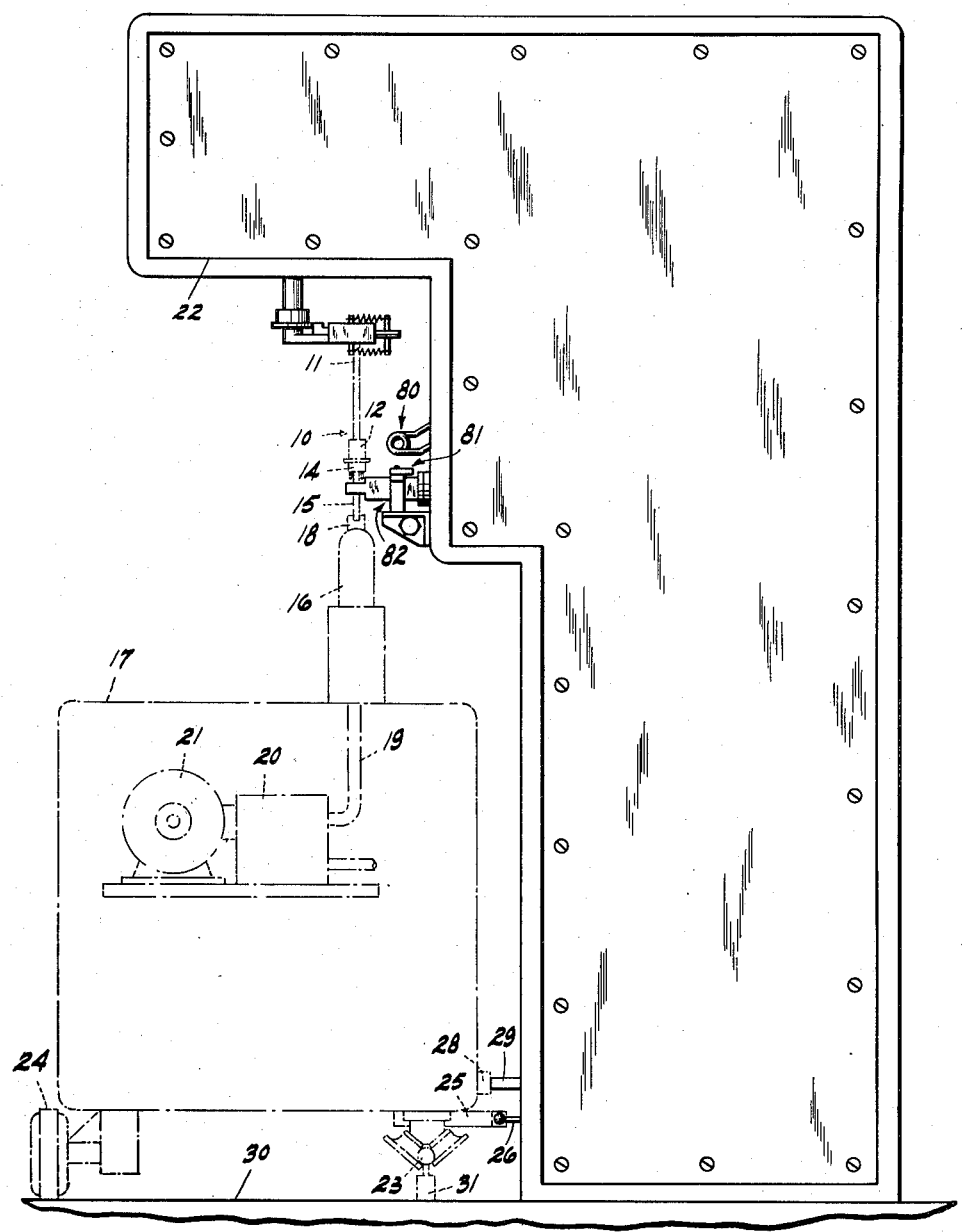
FIG. 1 is a side elevational view of the apparatus with an article in treating position.

In the present instance, an article 10 to be treated is an elongated hollow structure having a closed upper end 11, an intermediate portion 12, a base 14, and a tubulation 15. One or more of the articles 10 are mounted vertically in a holder 16 of a dolly 17 and have the tubulations 15 secured in sockets 18 of the holders and connected through suitable means 19 to a vacuum pump 20 driven by a motor 21. The dolly 17 is supported for movement in a given path, relative to a housing 22 disposed at a treating station or position, on a track 23 and a pneumatic tired wheel 24. The dolly 17 carries an element 25 recessed at its outer end to receive a locating plunger 26 operated by suitable means, not shown, and disposed in the housing 22. The dolly 17 also has a contact member 28 aligned with a contact element 29 when locked in the treating position to receive the contact element, which is moved into engagement with the contact member, to condition certain electrical circuits for operating the treating means.

The housing 22, mounted on the floor 30 which supports the track 23 at 31, extends upwardly and over the dolly to house the mechanism shown in FIGS. 2 to 7, inclusive. In the present instance, there are two spaced articles 10 carried by the holder 16 but positioned in alignment with each other so that only one is seen in FIG. 1. The mechanism, shown in FIGS. 2 and 3, includes pairs of clamps indicated generally at 33 and 34 and including like fixed position jaws 35 mounted on the outer ends of arms 36. The arms 36, as shown in FIG. 2, are mounted on the lower ends of spindles 37 and fixed thereto as at 38. Hollow guides 39 are mounted on the arms 36 to receive slides 40 for reciprocable movements therein. Movable jaws 41, mounted on the outer ends of the slides 40, are urged by springs 42 toward the fixed position jaws 35 to cooperate therewith to firmly grip the upper ends 11 of the articles 10 and to hold the articles through the forces of the springs 42.

Suitable means is provided to impart rotary movements to the clamps 33 and 34 relative to cams 43. The cams normally are stationary but are adjustable through suitable means 44 so that low portions 45 extend from points 46 beyond a normal position 47 for each clamp, after which high portions 48 build up to the end or drop off portion 49 of each cam in alignment with the portions 46. The inner ends 50 of the slides 40, carrying the movable jaws 41, ride upon the cam surfaces to assure opening of the clamping jaws when riding on the high portions 48 in advance of the treating position and to close on the upper ends 11 of the articles when moving off the drop off portions 49 to the low portions at 46.

The mechanism for driving clamping jaws 33 and 34 originates with a motor 53 driven at a suitable speed or through the aid of a speed reducing unit, not shown, to drive a spindle 54 of a clutch member 55. In the present instance, the clutch, indicated generally at 56, is of the one revolution type provided with a member 57 having a stop pin 58 to be engaged by a clutch control element 60 of a solenoid operating means 61. The clutch member 57 is mounted on a shaft 63 which has a camlike control element 64 mounted thereon. The element 64 is provided with a recess 65 or a low portion at the end of the first half cycle to receive a cam follower 66, carried by a spring-pressed rod 67, to permit a finger 68 movable with the rod to actuate a plunger 69 of a normally open switch 70 into closed position. The shaft 63 is journalled in suitable bearings 72 and has a gear 73 mounted thereon. The gear 73 interengages a gear 74 of the same size which is mounted on a shaft 75 parallel with the shaft 63. The gears 73 and 74 interengage like gears 77 and 78 which are mounted on the upper ends of the spindles 37.

As shown in FIG. 1, in alignment with the intermediate article portion 12, there are highly frequency coils 80 in alignment with terminals of the base 14, there are contact supporting elements 81 and, in alignment with a portion of the tubulation 15, there are pinch-off elements 82. The contact elements 81 are shown in detail in FIG. 8. In the present illustration, there are two contact elements 81 in the form of arm-like carriages 83 fixed at 84 to the upper end of spindles 85 which extend downwardly through suitable bearings supported at spaced positions by a bracket 86 fixedly mounted at 87 on a front portion of the housing 22. Contacts 88, 89, and 90 are supported by each carriage 83, insulated therefrom and electrically connected to terminals 91, 92, and 93 which are connected to suitable electrical conductors in treating circuits. A lever 94 is fixed to the lower end of each spindle 85 and provided with projections 95 and 96 at opposing sides thereof to engage adjustable stops 97 and 98, respectively, which control movements of the carriage and its contacts, in each instance, into and out of the treating positions. The outer end of each lever 94 is bifurcated at 99 for engagement with a pin 100 of a piston rod 101 of an air cylinder 102 which is the power means for actuating each carriage into and out of treating position.

In FIG. 8, the base 14 of each article 10 is illustrated in its respective position and three of the five terminals 103 of each base are engaged, respectively, by the contacts 88, 89, and 90.

Figure 6:
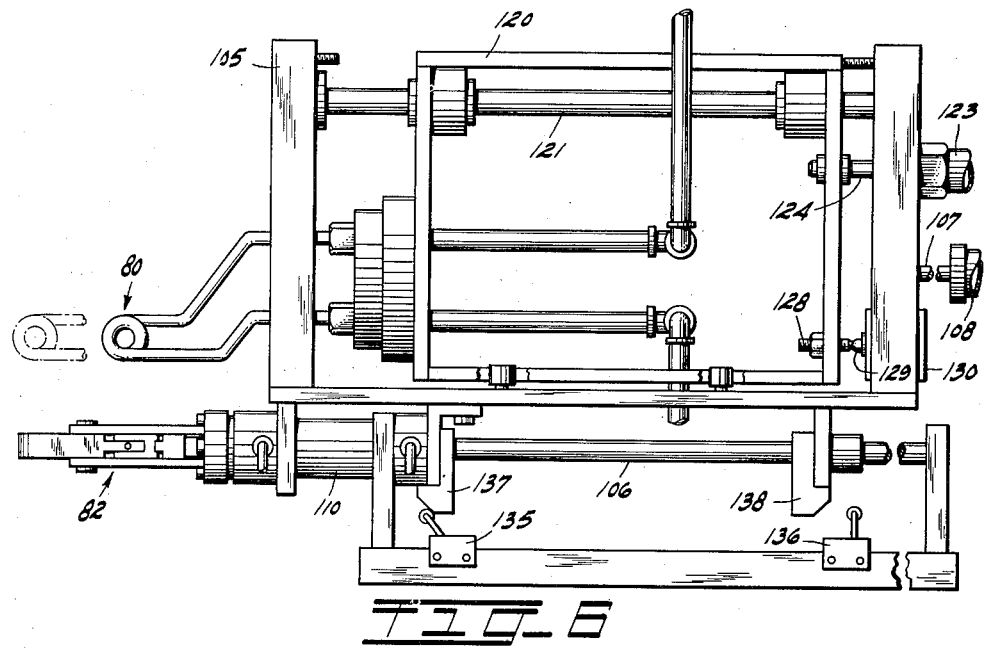
FIG. 6 is a side elevational view of a structure shown in FIG. 4.
Figure 7:
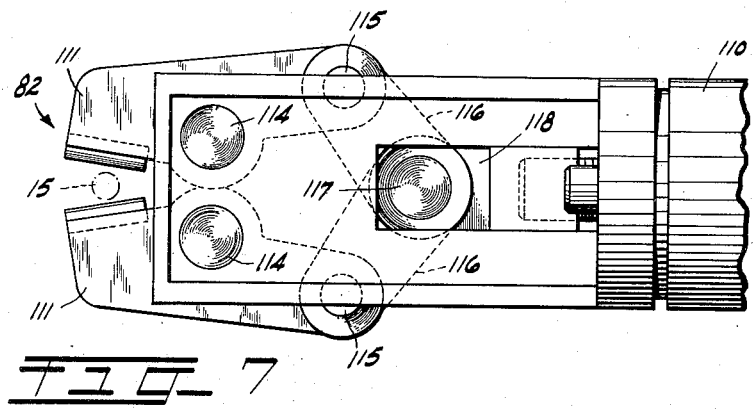
FIG. 7 is a fragmentary detailed view of one of the pinching jaws.

The high frequency coils 80 and the pinch-off elements 82 are supported by a carriage 105, FIGS. 4 and 6, supported for movement on parallel rods 106. The carriage 105 is under the control of a piston rod 107 of an air cylinder 108 for movement between a normal position to the right, FIG. 6, and an operating position shown where the pinching elements 82 in normally open positions, as shown in FIG. 7, will be moved to straddle the tubulations 15. The pinch-off elements 82 are disposed at spaced positions in general alignment with the two articles mounted in the holders 16 and are under the control of their respective air cylinders 110 which are supported by the carriage 105. Each element 82 has companion jaws 111 having inserts 112 of hardened steel to force the metallic tubulation 15 closed, seal it, and pinch off the excess portion thereof. The jaws 111 are pivoted at 114 near their center portions and have their inner ends connected pivotally at 115 to links 116. The inner ends of the links 116 are pivotally connected to a spindle 117 carried by a piston rod 118 of the air cylinder 110. The air cylinder 110, in each instance, is operated to be open normally during movement into the treating position so that the jaws will straddle the tubulation 15 but will not pinch off the tubulation until the article is evacuated.

Auxiliary carriages 120, supported singly at their upper ends by parallel bars 121 of the carriage 105 and guided by rollers 119 of the carriage near their lower ends, are movable with the carriage 105 under the action of the air cylinder 108 and individually relative thereto to move its respective high frequency coils 80 from their normal positions shown in solid lines in FIG. 6 to the dotted operating positions. In the present instance, there are four auxiliary carriages 120, one for each high frequency coil 80 and under the control of their respective air cylinders 123, the piston rods 124 of which are connected to the ends of their carriages 120. By viewing FIG. 6, it will be noted that each auxiliary carriage supports an adjustable screw 128 for actuating the plunger 129 of a switch 130 when in the normal position and to release the switch when the auxiliary carriage, in each instance, is moved toward the treating position. In the present instance, this may result in the energization of the high frequency coils 80, controlling their functions with regard to the article.

Figure 9:
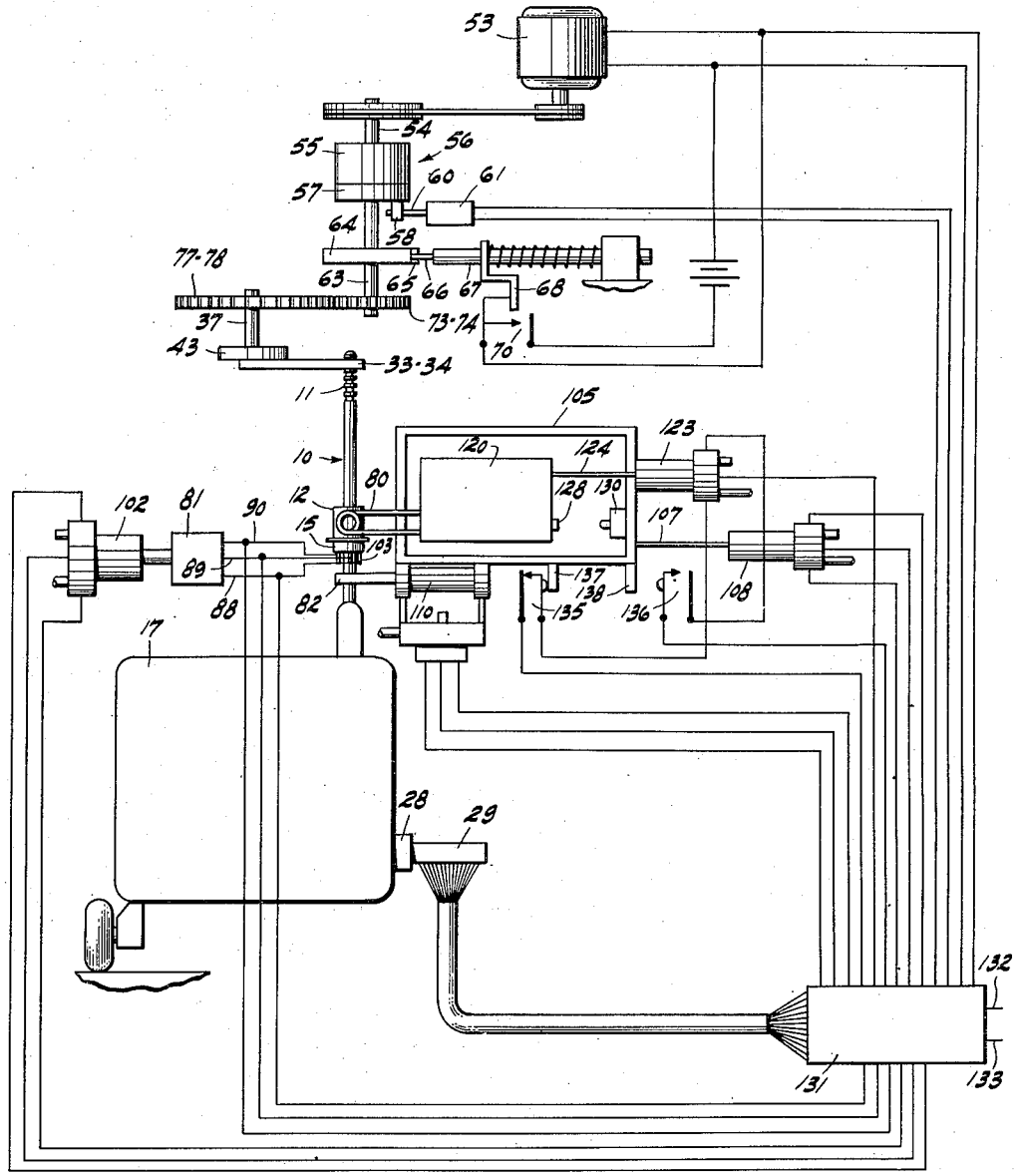
FIG. 9 is a schematic illustration of the control mechanism for the apparatus.

The electrical and pneumatic controls for the apparatus are shown schematically in FIG. 9. Each dolly 17, when moved into the treating position and temporarily locked against movement, presents its contact member 28 for engagement with the contact element 29. When this engagement is completed, a series of circuits are conditioned for operation in a predetermined order through the function of a time control and circuit controlling unit 131 which is supplied with suitable electrical energy through lines 132 and 133. Through the function of the unit 131, the motor 53 is operated and almost immediately solenoid 61 is energized to release the one-revolution clutch 56 to drive the shaft 63, one revolution to bring about one-half revolutions of spindles 37 to move the arms 33 and 34 into positions to cause their clamps to grip the upper ends 11 of the articles 10. Here the arms will remain as the momentary energization of the solenoid 61 has released its core 60 to disengage the clutch 56 after its single revolution.

At this time, the tops or upper ends of the articles 10 are held in the jaws 35—41 of the clamps of each arm 33 and 34 while the tubulations 15 remain in their holders 18. While in the treating position, each air cylinder 102 of the structure, shown in FIG. 8, is operated pulling the piston rods 101 outwardly to move their contacts 88, 89, and 90 into engagement with like leads of the articles. Also, air cylinder 108 is operated to move the carriage 105 and all the auxiliary carriages 120 toward the treating position to move during this action, the open pinching elements 82 into positions to straddle the tubulations 15. After this occurs during a predetermined interval, the high frequency coils 80 are moved into position for operation of their respective air cylinders 123 to move the auxiliary carriages 120 to the left. During the interval of time when the dolly is in the treating position, the pump 20 is operated to evacuate the hollow articles or traveling wave tubes and at a time when it is known that the articles are suitably evacuated, the air cylinders 110 will be operated to close the pinching jaws 111 to close, seal, and pinch off the excess portions of the tubulations 15. Switches 135 and 136 are responsive to projections 137 and 138, respectively, of the carriage 105 and, as illustrated, control the actions of the air cylinders 123 in moving the auxiliary carriages 120.

*Operation*

There may be numerous dollies movable into and out of different treating stations, but when they reach the present treating station, they are locked into position by the plunger 26 entering the recessed element 25. Following this action, the contact element 29 is moved into engagement with the contact member 28. Evacuation begins immediately and under the control of the unit 131, rendered effective through the interengagement of the element 29 and member 28, the other features of the apparatus function in predetermined orders. In each article 10, there is a fuse which is blown through the application of predetermined electrical energy thereto through certain of the contacts 88, 89, and 90 with terminals 103 of the articles 10. Also, in each article, there are getters which are out-gassed electrically and eventually flashed one at a time. These treating functions are performed by certain of the contacts 88, 89, and 90 with their respective terminals 103 and/or the high frequency coils 80. When suitable pressure has been reached, in the evacuation of the tubes or articles 10, this being controlled by the unit 131, the air cylinders 110 are operated to close, seal, and pinch off the tubulations.

After this has been accomplished, the carriage 105 is moved out of the treating position bringing with it the elements 82 and the coils 80, after which the solenoid 61 is energized a second time to release the one-revolution clutch 56 to drive the mechanism to move the arms 33 and 34 with the finished articles 10 out of the treating position where, through the aid of handles 140, the jaws may be opened to release the finished articles. The clamping jaws remain in the normal position until the next dolly with articles 10 to be treated is moved into position. The switch 70, under the control of the finger 68, causes de-energization of the motor 53 for the periods between the testing operations of the apparatus.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for treating hollow articles having open tubulations at like ends thereof comprising holders to receive the tubulations of the articles and support the articles thereby while being moved singly into a fixed position treating station, a plurality of electrically controlled units disposed at the treating station, electrical circuits for the treating units, a contact element movably disposed at the treating station and included in the circuits, a contact member carried by each holder and adapted for connection with the contact element when in the treating station to condition the circuits for closing, one of the units includes a clamp adapted to grip the article in the treating station, another unit is operable to pinch off the tubulation of the article, drive means for the clamp unit imparting two movements to the clamp, one to move the clamp into the treating station to grip the article and one to move the article out of the treating station subsequent to operation of the pinch-off unit, the drive means for the clamp unit in its two movements driving the clamp through a circuitous path, relatively movable jaws for the clamp, and a cam positioned in the clamp unit and adapted to cause relative movement of the jaws to close on the article in the treating station and to open to free the article when out of the treating station.

2. An apparatus for treating hollow articles having open tubulations at like ends thereof comprising holders to receive the tubulations of the articles and support the articles thereby while being moved singly into a fixed postion treating station, a plurality of electrically controlled units disposed at the treating station, electrical circuits for the treating units, a contact element movably disposed at the treating station and included in the circuits, a contact member carried by each holder and adapted for connection singly with the contact element when in the treating station to condition the circuits for closing, a circuit controlling unit rendered effective by engagement of the contact element with the contact member to operate the treating units in a predetermined order, an exhaust unit for each holder to exhaust the article held thereby through its tubulation, a carriage normally supporting one of the treating units away from a treating position adjacent the article, means to support the carriage for movement to transport said treating unit carried thereby between the normal position and the treating position, and means operable to move the carriage.

3. An apparatus for treating hollow articles according to claim 2 in which an auxiliary carriage is supported by and movable with the carriage, another treating unit including a high frequency coil supported by the auxiliary carriage and movable therewith on the carriage to a location short of a treating position therefor adjacent the article, and means operable to move the auxiliary carriage from a normal position on the carriage to move the high frequency coil to its treating position.

4. An apparatus for treating hollow articles according to claim 2 in which the treating unit supported by the carriage includes a pair of pinch-off jaws, means to exhaust the article through the tubulation, the jaws being caused to straddle the tubulation when in the treating position, and means supported by the carriage to cause the jaws to close on the tubulation, to close the tubulation, seal it and pinch-off an excess length thereof.

5. An apparatus for treating hollow articles according to claim 3 in which a normally open switch is disposed in one of the circuits and is operated closed by the carriage when reaching its treating position to cause operation of the auxiliary carriage moving means to move the high frequency coil to the treating position.

6. An apparatus for treating hollow articles according to claim 5 in which another normally open switch in another of the circuits is positioned to be operated closed when the carriage returns to its normal position to cause the auxiliary carriage moving means to move the auxiliary carriage to its normal position.

7. An apparatus for treating hollow articles having bases with spaced terminals extending therefrom and open tubulations at like ends thereof comprising holders to receive the tubulations of the articles and support the articles thereby while being moved singly into a fixed position treating station, a plurality of electrically controlled units disposed at the treating station, electrical circuits for the treating units, a contact element movably disposed at the treating station and included in the circuits, a contact member carried by each holder and adapted for connection singly with the contact element when in the treating station to condition the circuits for closing, a circuit controlling unit rendered effective by the engagement of the contact element with the contact member to operate the treating units in a predetermined order, one of the treating units including a carriage supported for movement between a normal position and a treating position, contacts supported by the carriage, included in certain of the circuits and spaced to engage their respective terminals of the article so that internal portions of the article may be treated, and means operable to move the carriage with the contacts into and out of treating position.

8. An apparatus for treating hollow articles according to claim 7 in which a variable element mounted relative to the carriage varies the position of the contacts relative to their terminals in the treating position.

References Cited in the file of this patent

UNITED STATES PATENTS

| 1,967,571 | Dumont et al. | July 24, 1934 |
| 2,069,086 | Donovan et al. | Jan. 26, 1937 |
| 2,273,439 | Freeman | Feb. 17, 1942 |
| 2,532,315 | Johnson et al. | Dec. 5, 1950 |
| 2,829,941 | Laubscher | Apr. 8, 1958 |